(No Model.)
H. HESS.
STOCK CAR.
No. 298,968. Patented May 20, 1884.
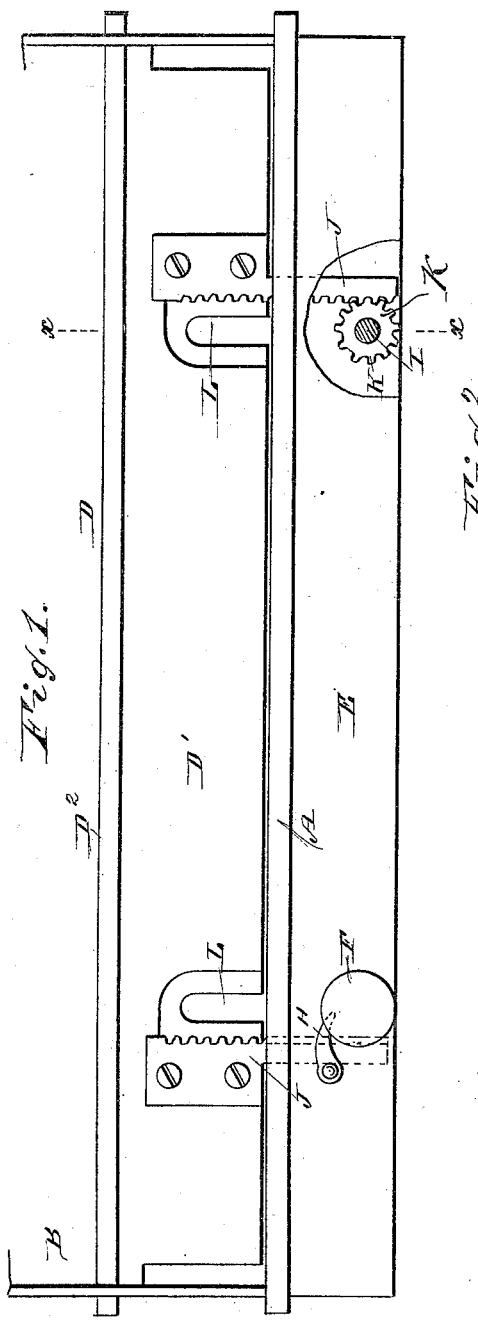
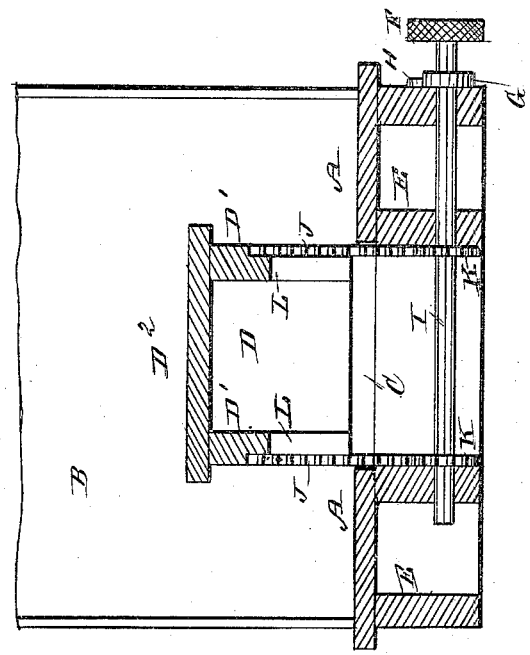
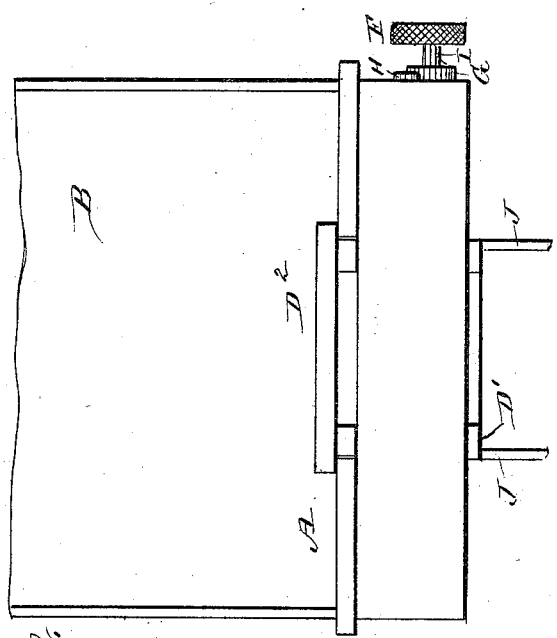
WITNESSES:
INVENTOR:
H. Hess
BY Munn & Co
ATTORNEYS.

UNITED STATES PATENT OFFICE.

HENRY HESS, OF CANFIELD, OHIO.

STOCK-CAR.

SPECIFICATION forming part of Letters Patent No. 298,968, dated May 20, 1884.

Application filed March 13, 1884. (No model.)

*To all whom it may concern:*

Be it known that I, HENRY HESS, of Canfield, in the county of Mahoning and State of Ohio, have invented a new and Improved Cattle-Car, of which the following is a full, clear, and exact description.

The object of my invention is to provide a new and improved cattle-car, the floor of which can be so adjusted as to prevent the animals from lying down, thus preventing the stronger animals from trampling on the weaker animals.

The invention consists in the construction and arrangement of parts as will be hereinafter fully described, and specifically set forth in the claims.

Reference is to be had to the accompanying drawings, forming part of this specification, in which similar letters of reference indicate corresponding parts in all the figures.

Figure 1 is a longitudinal elevation of my improved cattle-car, parts being broken out and the sides of the car being removed. Fig. 2 is an end view of the car. Fig. 3 is a cross-sectional elevation on the line $x x$, Fig. 1, the platform being raised.

The floor A of the cattle-car B is provided along its central lines with a longitudinal opening, C, in which a platform, D, fits, constructed with two sides, D', on which a top plate, D², is secured, which, when the platform is lowered, rests on the car-floor at the edges of the opening C, as shown in Fig. 2. At or near each end of the car a transverse shaft, I, is journaled below the car-floor in the longitudinal beams E, one end of each of which shafts projects from the side of the car, and is provided with a hand-wheel, F, or other handle or device for turning it. On each shaft a ratchet-wheel, G, is mounted, and on each ratchet-wheel the free end of a pawl, H, rests, which pawl is pivoted to the side of the car. From each side plate, D', of the platform D a rack, J, projects downward at each end, which racks engage with cog-wheels K, mounted on the shafts I. The side boards, D', of the platform D are provided with recesses L, into which the shafts I pass when the platform D is lowered. By turning the shafts I the cog-wheels K raise the platform D from the floor A, so that the raised platform will be between the front and hind legs of the animals. The pawls H and the ratchet-wheels prevent the platform from descending. As long as the platform D is raised the animals must stand and cannot lie down, and thus the stronger animals cannot trample on the weaker animals.

The platform can be raised and lowered very easily, and when the platform is lowered the car can be used the same as an ordinary cattle or freight car.

Having thus described my invention, I claim as new and desire to secure by Letters Patent—

1. The combination, with a car, of the vertically-movable platform D, having recesses L in its sides, the racks J, the shafts I, and the cog-wheels K, substantially as herein shown and described.

2. The combination, with a car, of the vertically-movable platform D, the racks J, the shafts I, the cog-wheels K, the ratchet-wheels G, and the pawls H, substantially as herein shown and described.

HENRY HESS.

Witnesses:
J. R. JOHNSTON,
M. KIMERLE.